United States Patent [19]

Baskin

[11] 4,002,592
[45] Jan. 11, 1977

[54] FRICTION MATERIALS CONTAINING SPINEL SOLID SOLUTION AS FRICTION MODIFIER

[75] Inventor: Yehuda Baskin, South Euclid, Ohio
[73] Assignee: Ferro Corporation, Cleveland, Ohio
[22] Filed: Jan. 9, 1976
[21] Appl. No.: 646,613

Related U.S. Application Data

[63] Continuation-in-part of Ser. No. 548,014, Feb. 7, 1975, Pat. No. 3,959,208.
[52] U.S. Cl. .................................... 260/38; 106/36; 260/DIG. 39
[51] Int. Cl.$^2$ .................. C08J 5/14; C08K 7/08
[58] Field of Search .......... 423/600, 594, 595, 598, 423/599; 106/36; 260/38, DIG.39

[56] References Cited

UNITED STATES PATENTS

| | | | |
|---|---|---|---|
| 3,438,724 | 4/1969 | Hartford et al. | 423/598 |
| 3,484,376 | 12/1969 | Paris et al. | 423/594 |
| 3,577,354 | 5/1971 | Kehl | 423/594 |
| 3,595,810 | 7/1971 | Kehl | 423/594 |

*Primary Examiner*—Melvyn I. Marquis
*Assistant Examiner*—S. M. Person
*Attorney, Agent, or Firm*—Milton L. Simmons; Wesley B. Taylor

[57] ABSTRACT

Friction material adapted for use, for example, as a brake lining is disclosed characterized in that the material contains in particulate form a crystalline mineral friction modifier of an isomorphous substitutional solid solution consisting essentially of atoms of metals and oxygen arranged as a mixed crystal in a normal spinel crystal lattice structure. There are at least three different metal atoms present in the crystal lattice, the total number of metal atoms having a total valence charge sufficient to maintain electrical neutrality. The friction material may be conventionally supported as by a shoe or disc.

20 Claims, No Drawings

FRICTION MATERIALS CONTAINING SPINEL SOLID SOLUTION AS FRICTION MODIFIER

CROSS-REFERENCE TO RELATED APPLICATION

This is a continuation-in-part of an application Ser. No. 548,014, filed Feb. 7, 1975, now U.S. Pat. No. 3,959,208.

BACKGROUND OF THE INVENTION

Friction material such as that used in brake lining, clutches, and the like has severe performance requirements. The principal function of a friction element like a brake lining is to convert kinetic energy to heat and to absorb the heat or otherwise dissipate it while simultaneously through the agency of friction to reduce relative movement between the friction material and a part engaged by it. To achieve these objectives, it is necessary that the coefficient of friction between the friction material and the part so engaged be as high as possible, independent of variations in operating conditions, and accomplish the necessary energy conversion with a minimum wear of contacting parts. In particular, a friction material should not only have a relatively high coefficient of friction, but as well possess durability, heat stability, generate little or no noise while in rubbing contact with an engaging part, such as a rotor, and cause a minimum of wear on the engaged part.

In general, a friction material contains a matrix or binder, such as a thermosetting resin or vulcanized rubber, a fibrous reinforcement, and a friction modifier which aids in imparting a desired coefficient of friction to the material. Often the friction material may also contain fillers or extenders which modify its physical characteristics and reduce its cost. The fibrous reinforcement is usually asbestos, although fibers of other high temperature resistant materials can be used as well to hold or bind together the components of friction material.

Under certain conditions such as overheating or contacting water, asbestos fibers have a tendency to glaze so that a lower coefficient of friction results. Subsequently, when an operator of a car, for example, attempts to operate the brake, the ability of the brake lining to perform as designed is seriously hampered and accidents have occurred as a result. Accordingly, an additive friction modifier which increased the coefficient of friction would be especially useful in friction material containing asbestos as the fibrous reinforcement.

Many frictional elements like brake linings have a tendency toward "fade," which may be considered to be the inability to maintain a reasonably constant value of friction during repeated application of a brake system at a given speed, usually due to overheated break linings. All linings exhibit fade to some extent. The inclusion of heat conducting particles, such as metal particles, in the friction material has been suggested to reduce the tendency to fade. However, this shortcoming still remains a serious problem.

SUMMARY OF THE INVENTION

The principal object of the present invention is to provide a friction material or element by incorporating a crystalline mineral friction modifier of an isomorphous substitutional solid solution, consisting essentially of atoms of metals and oxygen arranged as a mixed crystal in a normal spinel crystal lattice structure, into a preferably fibrous reinforced body or matrix of a rigid, thermosetting, heat-resistant, organic resin. The spinel is present in any amount necessary to impart a desired coefficient of friction to the resulting material. The organic resin is preferably a phenolic resin to increase the friction of the material. The fibrous reinforcement is usually asbestos.

The spinel normal crystal lattice structure, preferably used in particulate form, corresponds to the formula:

$$AB_2O_4$$

in which A represents one or more monovalent or divalent metal atoms, and B represents one or more trivalent, tetravalent, pentavalent, or hexavalent metal atoms. The metal atoms are substituted in and occupy sites in the spinel crystal lattice. There are at least three different metal atoms present, and the total number of metal atoms has a total valence charge of eight to maintain electrical neutrality.

The friction material may be prepared by mixing, for example, from about 20 parts to about 80 parts by weight of a liquid thermosetting resin that is in the A stage of polymerization, from about 1 part to about 20 parts of a described particulate normal spinel having, for example, an average particle size of about 0.5 micron to about 10 microns, and from about 5 parts to about 40 parts of a fibrous reinforcement. In addition, fillers or extenders known in the art may be added to the mixture, if desired, up to about 30 parts by weight to vary physical properties and reduce the overall cost of the material.

The liquid mixture of A stage thermosetting resin and ground spinel may be suitably shaped as by molding, calendaring, sheeting and the like, followed by a final cure of the resin. Strips may be cut from the resulting sheet to form the present friction material. The strips may then be suitably secured to a backing member such as a brake shoe or disc.

DESCRIPTION OF THE PREFERRED EMBODIMENTS

In general, friction material of the present invention comprises a rigid, thermosetting, heat-resistant, organic resin that is preferably fibrous reinforced, and a crystalline mineral friction modifier consisting essentially of a particulate normal spinel solid solution present in an amount to impart a desired coefficient of friction to the material. Optionally, fillers and extenders may also be included.

Any thermosetting, heat-resistant, organic resin capable of withstanding the heat generated by friction material of which the resin forms may be used. As a rule, phenolic resins are best for this purpose, such as phenol-formaldehyde and phenol-furfural, but other thermosetting resins may also be used such as melamine-formaldehyde, urea-formaldehyde, epoxy resins, diallyl phthalate resins, dioctyl phthalate resins, cross-linked alkyd resins, and the like. Phenol-formaldehyde is preferred.

For some applications, elastomers may be included with the thermosetting heat-resistant organic resin to increase the frictional grab of the friction material. Although the elastomers need not be vulcanized, vulcanizable elastomers are preferred, and for this purpose known vulcanizing and/or curing agents are included with the mix forming the friction material. The elastomer is then vulcanized at the same time as the thermosetting resin is further or finally cured. Examples of elastomers that may be used include natural rubber, butadiene-acrylonitrile, butadiene-styrene, polybutadiene, and the like. As used here and in the claims the term "rigid, thermosetting, heat-resistant, organic resin" is taken to mean a thermosetting organic resin as described and such a resin in combination with an elastomer as herein disclosed.

My copending application, Ser. No. 548,014, now U.S. Pat. No. 3,959,208, discloses the use of normal spinels as a friction modifier for friction material in which the spinels contain two different metal atoms. It has now been discovered that a vast array of still other spinels is useful as friction modifiers in which there are three or more different metal atoms. The present friction modifier is a crystalline mineral of an isomorphous substitutional solid solution consisting essentially of atoms of metals and oxygen arranged as a mixed crystal in a normal spinel crystal lattice structure.

In general, when two metals, such as A and B, have the same structure, the addition of A to B produces a solid solution in which the geometrical arrangement of the atoms is the same as in pure A and B with the two kinds of atoms arranged at random. There are many pairs of substances with exact or similar crystal structures that form either a limited or complete range of solid solutions. However, there are also so many complicating factors that in general no prior deductions can be made about the structures of the two substances from their ability or failure to form solid solutions. A compound is described as polymorphic if it forms two or more crystalline solid phases differing in atomic arrangement. The different structures are merely different packings of the same atomic building units.

In the present case, the crystalline friction modifier is a solid solution formed from metal atoms in the normal spinel crystal lattice structure. The technique of forming a normal spinel crystal lattice structure is known in the art and does not form part of the present invention. In general, the chosen metal oxides are calcined in admixture. The ingredients may be heated to a temperature sufficient to melt them, although this is not necessary. Preferably, they are heated only to a temperature at which solid state reactions may take place. This is easily determined by trial and error, and normally can lie within the range of about 950° C to about 1600° C. The calcined ingredients are then permitted to cool and crystallize in the normal spinel crystal lattice structure. In forming a solid solution, one metal oxide may be considered as the host crystal lattice, and the other ingredients regarded as additive or substitutional atoms in the host crystal.

There are two ways in which a random number of added atoms can fit into a crystal lattice structure. In one way, the substituted atoms fit into normally unoccupied interstitial sites within the crystal. This is termed interstitial solid solution. In another way, the added atoms fit in positions normally occupied in the host structure itself. This is called substitutional solid solution and is the type embodied by the present friction modifier. If accurate goniometric measurements are necessary to distinguish between two crystals by morphological methods, such crystals are said to be isomorphous. In particular, then, the present normal spinel crystal lattice structures may be characterized as isomorphous substitutional solid solutions.

Solid solutions are stable when a mixed crystal comprising a solid solution as defined has a lower free energy than other alternative arrangements of the atoms involved. Substitutional solid solutions are examples of defect solids, since all the crystallographically eqivalent positions are occupied although by atoms of different kinds. However, since in substitutional solid solutions of the present friction modifier, the atoms have different valences, it is necessary that the number of different atoms have a total valence charge that preserves electrical neutrality. In a spinel crystal lattice structure of four oxygen atoms, the total valence charge is eight.

In particular, a normal spinel crystal lattice structure of the present invention corresponds to the formula:

$$AB_2O_4$$

in which A represents one or more monovalent or divalent metal atoms, and B represents one or more trivalent, tetravalent, pentavalent, or hexavalent metal atoms, such metal atoms being substituted in and occupying sites in the normal spinel crystal lattice structure. There are at least three different metal atoms in the indicated formula, the total number of metal atoms having a total valence charge of eight to maintain electrical neutrality with the negative charge of eight for the four oxygen atoms.

All known metal atoms can be used in the indicated formula as long as the indicated valences are observed, and there are three or more metal atoms present whose total charge preserves the indicated electrical neutrality with the number of oxygen atoms present. The preferred metals for component A include Na, K, Ag, Li, Mg, Fe, Co, Mn, Zn, Ni, Cu and Cd. The preferred metals for component B include Mo, W, Al, Fe, Cr, Mn, Ti, V, Cb and Ta. It will be noted that some metals, such as iron and manganese, may be either A or B, depending on whether the valence is divalent or greater than divalent. However, the minimum of three metals must all be of different metals.

As indicated, in the present friction modifier metal atoms can replace each other indiscriminately in an isomorphous substitutional solid solution which forms the normal spinel crystal lattice structure. It will be appreciated that there can be a complete series of solid solutions formed with the same three or more metal atoms in which the metal atoms are present in varying amounts, as long as electrical neutrality is preserved. The situation is similar to that which prevails when liquid ingredients are soluble in all or most all proportions. In such solid solutions, it is at times necessary to leave an occasional atom site vacant to maintain the electrical neutrality of the crystal lattice structure.

It will be further appreciated that the defined formula, $AB_2O_4$, refers to the simplest structure. Other structures are possible but based on this same formula. For example, the crystal lattice structure can be represented as greater associations of the specific formula such as $(AB_2O_4)_2$ or $(AB_2O_4)_3$.

The preferred metals and metal oxides for forming the present solid solutions are those which, if independently calcined and subsequently cooled, still form the normal spinel crystal lattice structure. In my copending application, Ser. No. 548,014, a friction material is disclosed containing a two-metal normal spinel such as $ZnFe_2O_4$. As an illustration of one three-metal spinel useful in the present friction material and as a further illustration of the range of substitution that is possible in spinel solid solutions, titania can replace varying amounts of the iron in the mentioned two-metal spinel, as indicated by the following formula:

$$Zn^{2+}(Ti_x^{4+}, Fe^{3+}_{1-2x}, Fe_x^{2+})O_4^{8-}$$

in which $x$ can be any positive value, for example 0.001 up to 1.0 or more. When $x$ equals one, the formula reduces to another useful spinel solid solution, $(Zn,Fe)TiO_4$. The exponents represent the valences of the atoms.

Specific useful substitutional solid solutions arranged as a mixed crystal in a normal spinel crystal lattice structure include the following:

$(Zn_{0.5}Fe_{0.5})Cr_2O_4$
$(Zn_{0.5},Mg_{0.5})Fe_2O_4$
$(Zn_{0.5},Mg_{0.5})AlFeO_4$
$ZnAlFeO_4$
$Na_{0.1},Zn_{0.8},Fe_{2.1}O_4$
$LiCoMnO_4$
$(K_{0.66}Ag_{0.66}Cu_{0.66})CrO_4$
$(Na_{0.5}K_{0.5})FeTiO_4$
$LiNaMoO_4$
$KNiCbO_4$
$CoCdTiO_4$
$KAgWO_4$
$(Mn_{0.5}Fe_{0.5})Al_2O_4$
$Na(Zn_{0.5}Fe_{0.5})VO_4$
$NaZnVO_4$
$KMgTaO_4$

Of the foregoing specific examples, zinc-containing spinel solid solutions in spinel crystal lattice structure form are desired. The first three listed specific spinels are preferred.

The mechanism whereby all of the spinels herein disclosed and contemplated improve the performance of friction material, such as brake material, is not clearly known. Presumably, the chemical composition, refractoriness, and mechanical properties of the spinels in some manner have a salutary effect. The presence in the normal spinel crystal lattice structure of four independent mechanical slip systems is thought to be contributory to the improved results obtained by inherently possessing desirable joint mechanical and frictional ramifications.

Prior to incorporation in the thermosetting, heat-resistant organic resin, a spinel solid solution, herein referred to for convenience as a spinel, is suitably ground, as in a ball mill. Or the spinel can by synthesized in particulate form. Particle size is not critical and for most purposes an average particle of about 0.5 micron to about 10 microns provides good results.

Other additives, modifiers, fillers, extenders known in the art may be added to the thermosetting organic resin and the spinel. Such other added ingredients include, for instance, barytes, graphite, talc, litharge, kaolin, rosin, waterproofing agents such as waxes like mineral, hydrocarbon and vegetable waxes including, for example, beeswax, Montan wax, paraffin wax, ceresin wax, and the like (such waxes also lubricating the mixing together of the components of the friction material), minor amounts of oxides such as lime, zinc oxide, lead dioxide, silica sand, and manganese dioxide, sulfur (when vulcanization of an elastomer is contemplated), and the like. As used here and in the claims, the term "filler" or "filler material" is taken to include all of the foregoing and similar materials.

In like manner, the fibrous reinforcement may be fibers of any material which are capable of retaining their fibrous identity at temperatures of application of the friction material, such as glass fibers, asbestos fibers and other like mineral fibers.

Proportions are not critical. In general, the friction material contains in parts by weight from about 20 to about 80 parts of the resin, from about 5 to about 40 parts of a fibrous reinforcement, and from about one to about 20 parts of the spinel. When an elastomer is added, it may be used up to about 12 parts by weight. When filler material is used, it may be added up to about 30 parts by weight. On a comparable percentage basis, the spinel may be present in an amount of about 0.8% to about 45% by weight of the friction material.

To prepare the present friction material, the thermosetting, heat-resistant, organic resin, while in a sufficiently low polymeric state as to be liquid, is mixed with the spinel, fibrous reinforcement, if desired, and any filler material that may also be desired. When an elastomer is to be used, it may first be dissolved in a suitable solvent such as is known in the art, like methyl ethyl ketone, dimethyl sulfoxide, etc., and then added to the resin, followed in turn by the spinel, and any reinforcement or filler material that may be used. The mixture is stirred as the ingredients are added, as on a mixing mill or internal mixer, and optionally warmed until a uniform consistency is obtained. Where necessary or desired, the wet master mix may then be slowly and slightly warmed to hasten removal of the solvent.

Following this, a requisite amount of the master mix is placed in a die cavity, which has the desired geometry for the ultimate shape of the friction element, and then subjected to a pressure adapted to afford the desired density in the finally molded part. The press conditions for partially curing the master mix are determined principally by the nature of the thermosetting organic resin and are known in the art. As a rule, curing the mix at temperatures up to about 325° F for 20 to 60 minutes suffices, depending on the thickness of the part being molded.

After partial cure under pressure, the mix now shaped as a strip or lining is removed from the die and subjected to a final cure, the conditions of which again depend on the nature of the components of the friction material. In general, finally curing at temperatures of about 375° F to 425° F for 6 to 8 hours for each one-half inch thickness of strip or lining suffices.

Alternatively, the friction material can be pressed and cured in sheets, generally following the above indicated procedure, and individual friction elements then cut from the resulting sheets.

After preparing a strip or other form of the present friction material, it may be suitably secured, as by countersunk rivets or an adhesive, to a rigid backing member designed to support the friction material during its use. For example, the strip may be fastened either to a curved surface of an ordinary automotive brake shoe, where the lining is pressed against the internal surface of a rotating drum of a car wheel, or fastened to one face of a stator disc and pressed against a rotor disc secured to a car wheel. Examples of both types of application are illustrated in the figures of U.S. Pat. No. 3,477,983 to Keller. The present friction material can also be used as a brake lining in the manner illustrated by U.S. Pat. No. 1,851,087 to Denman.

The following examples only illustrate the invention and should not be construed as imposing limitations on the claims.

EXAMPLE 1

A friction material of the present invention was prepared in the following manner. A supply of spinel solid solution, $(Zn_{0.5}, Fe_{0.5})Cr_2O_4$, was used. This crystalline material was cubic and in particulate form with an average particle size of 2.2 microns. To liquid phenol-formaldehyde in the A stage, a sufficient amount of the spinel was added to constitute 5% by weight of the resin-spinel mixture. The mixture was stirred to a substantially uniform consistency, asbestos fibers added in an amount equal to about 20% by weight of the resulting mixture, and the mixture then poured into a female mold of a die press to form a layer of about 0.5 inch in thickness. The press was closed and heated at about 325° F for about 0.5 hour. When the press was opened, an integral strip of friction material was removed and finally cured at 375° F for about 7 hours.

EXAMPLE 2

A procedure was carried out like the procedure of Example 1 except that the spinel was $(Zn_{0.5}, Mg_{0.5})Fe_2O_4$, and the master mix had this formulation in weight percent:

| | |
|---|---|
| Spinel | 3% |
| Beeswax | 5% |
| Kaolin | 8% |
| Asbestos fibers | 25% |
| Phenol-Formaldehyde (A Stage) | Balance |

EXAMPLE 3

A procedure was carried out like the procedure of Example 1 except that the spinel solid solution was $(Zn_{0.5}, Mg_{0.5})AlFeO_4$, and the master mix had this formulation in weight percent:

| | |
|---|---|
| Spinel | 5% |
| Vulcanizable butadiene-acrylonitrile rubber | 7% |
| Graphite | 9% |
| White lead (rubber cure) | 6% |
| Asbestos fibers | 30% |
| Phenol-formaldehyde (A Stage) | Balance |

In preparing the master mix of this example, the butadiene-acrylonitrile rubber was dissolved in a solvent consisting of four parts by weight of methyl ethyl ketone, seven parts hydrogenated naphtha, and one-half part of water. The phenolic resin was then added and, when the mixture was of a uniform consistency by stirring, the remaining ingredients were added except for the spinel and fibers. After a uniform consistency had again been attained by stirring, the spinel was added in increments, and then the asbestos while maintaining uniform consistency. The wet mixture was then warmed slightly to aid in evaporation of the solvent. Following this, the molding procedure was the same as in Example 1.

Other spinels, thermosetting resins, and filler material chosen from those previously disclosed could be used in place of the specific materials of these examples.

Although the foregoing describes several embodiments of the present invention, it is understood that the invention may be practiced in still other forms within the scope of the following claims.

I claim:

1. In friction material comprising a rigid, thermosetting, heat-resistant, organic resin and a friction modifier, the improvement comprising a crystalline mineral friction modifier of an isomorphous substitutional solid solution consisting essentially of atoms of metals and oxygen arranged as a mixed crystal in a normal spinel crystal lattice structure and corresponding to the formula:

$$AB_2O_4$$

in which A represents one or more monovalent or divalent metal atoms, B represents one or more trivalent, tetravalent, pentavalent, or hexavalent metal atoms, said metal atoms being substituted in and occupying sites in the normal spinel crystal lattice structure, there being at least three different metal atoms present and having a total valence charge of eight to maintain electrical neutrality, said normal spinel crystal lattice structure being present in an amount to impart a desired coefficient of friction to said material.

2. The friction material of claim 1 in which A is selected from the group consisting of Na, K, Ag, Li, Mg, Fe, Co, Mn, Zn, Ni, Cu and Cd.

3. The friction material of claim 1 in which B is selected from the group consisting of Mo, W, Al, Fe, Cr, Mn, Ti, V, Cb, and Ta.

4. The friction material of claim 1 containing a fibrous reinforcement.

5. The friction material of claim 1 containing in parts by weight from about 20 to about 80 parts of said resin, from about 1 to about 20 parts of said spinel crystal lattice, and from about 5 to about 40 parts of reinforcing fibers.

6. The friction material of claim 5 containing up to about 30 parts by weight of filler material.

7. The friction material of claim 1 in which said resin is a phenolic resin.

8. The friction material of claim 1 in which said resin is phenol-formaldehyde resin.

9. The friction material of claim 1 in which said normal spinel crystal lattice consists essentially of $(Zn_{0.5} Fe_{0.5}) Cr_2O_4$.

10. The friction material of claim 1 in which said normal spinel crystal lattice consists essentially of $(Zn_{0.5} Mg_{0.5}) Fe_2O_4$.

11. The friction material of claim 1 in which said normal spinel crystal lattice consists essentially of $(Zn_{0.5} Mg_{0.5}) AlFeO_4$.

12. The friction material of claim 1 in which said spinel is present in particulate form and has an average particle size of about 0.5 micron to about 10 microns.

13. A friction element comprising in parts by weight from about 20 to about 80 parts of a thermosetting phenolic resin, from about 5 to about 40 parts of reinforcing fibers, from about 1 to about 20 parts of a crystalline mineral friction modifier of an isomorphous substitutional solid solution consisting essentially of atoms of metals and oxygen arranged as a mixed crystal in a normal spinel crystal lattice structure and corresponding to the formula:

$$AB_2O_4$$

in which A represents one or more monovalent or divalent metal atoms, B represents one or more trivalent, tetravalent, pentavalent or hexavalent metal atoms, said metal atoms being substituted in and occupying sites in the normal spinel crystal lattice structure, there being at least three different metal atoms present and having a total valence charge of eight to maintain electrical neutrality, said normal spinel crystal lattice structure being present in particulate form and in an amount to impart a desired coefficient of friction to said material.

14. The friction element of claim 13 in which A is selected from the group consisting of Na, K, Ag, Li, Mg, Fe, Co, Mn, Zn, Ni, Cu, and Cd.

15. The friction element of claim 13 in which B is selected from the group consisting of Mo, W, Al, Fe, Cr, Mn, Ti, V, Cb, and Ta.

16. The friction element of claim 13 in which said phenolic resin is a phenol-formaldehyde resin.

17. The friction element of claim 13 in which said normal spinel crystal lattice consists essentially of $(Zn_{0.5},Fe_{0.5})Cr_2O_4$.

18. The friction element of claim 13 in which said normal spinel crystal lattice consists essentially of $(Zn_{0.5},Fe_{0.5})Fe_2O_4$.

19. The friction element of claim 13 in which said normal spinel crystal lattice consists essentially of $(Zn_{0.5}, Mg_{0.5})AlFeO_4$.

20. The friction element of claim 13 in which said element is a brake lining.

* * * * *